July 7, 1964 A. FEINER ET AL 3,140,355

CONTROL CIRCUIT FOR TELEPHONE LINE CONCENTRATOR

Filed Dec. 14, 1961 2 Sheets-Sheet 1

INVENTORS A. FEINER
T. N. LOWRY
BY S E Hollander
ATTORNEY

CONTROL CIRCUIT FOR TELEPHONE LINE CONCENTRATOR

Filed Dec. 14, 1961 2 Sheets-Sheet 2

INVENTORS A. FEINER
T. N. LOWRY
BY
S E Hollander
ATTORNEY 3,140,355

CONTROL CIRCUIT FOR TELEPHONE LINE CONCENTRATOR

Alexander Feiner, Morris Plains, N.J., and Terrell N. Lowry, New York, N.Y., assignors to Bell Telephone Laboratories, Incorporated, New York, N.Y., a corporation of New York Filed Dec. 14, 1961, Ser. No. 159,275
14 Claims. (Cl. 179—18)

Figure 1:
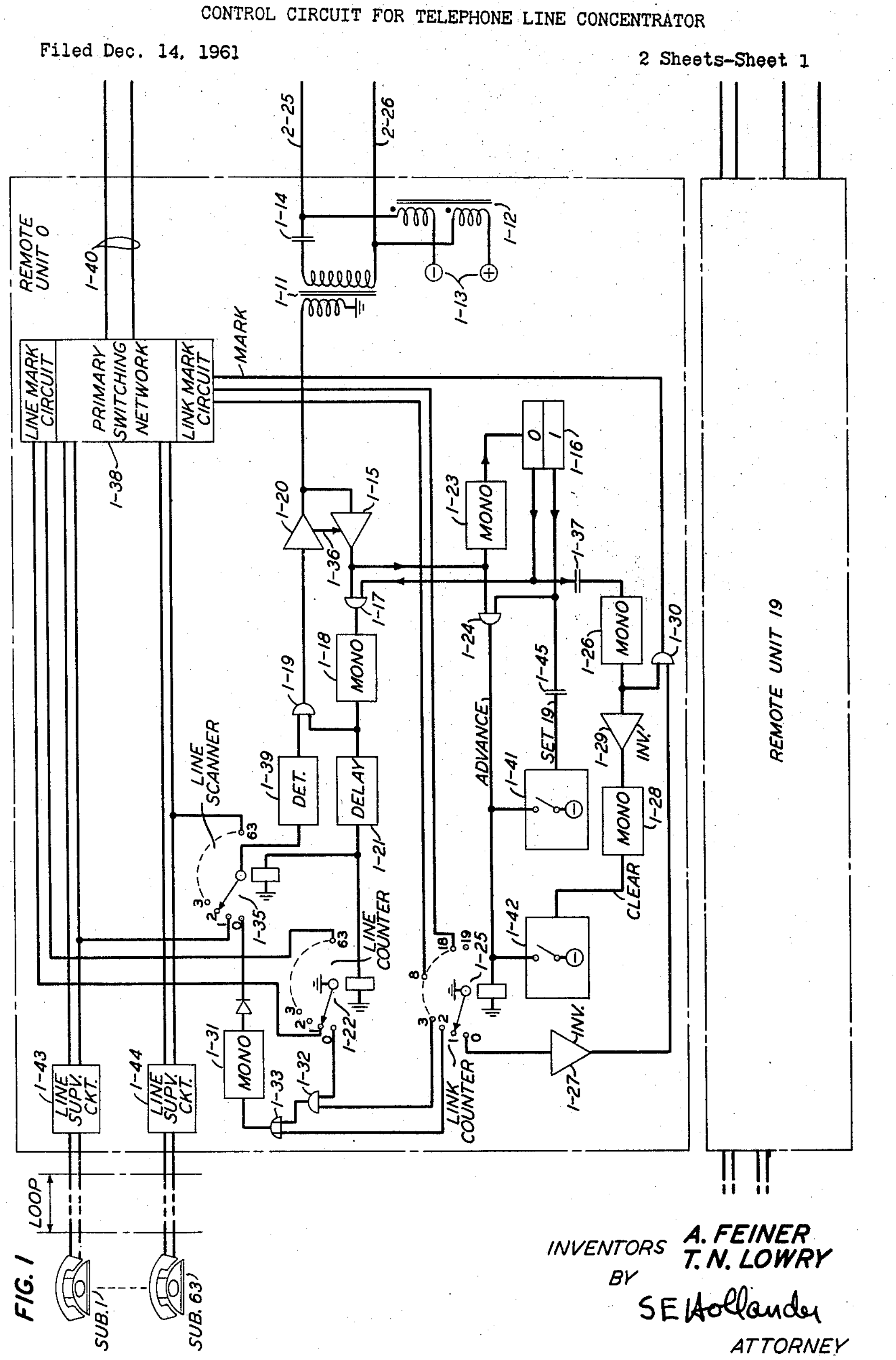

This invention relates to telephone line concentrator systems and more particularly to control and supervisory signaling circuitry for such systems.

Telephone line concentrators have found increasing acceptance in telephone technology due, in part, to the economies afforded in outside plant equipment. In practice, telephone line concentration presupposes the coupling of a relatively larger number of substation lines to a smaller number of concentrator trunks extending to a telephone central office. The lines are connected selectively to the trunks through a remotely positioned concentrator or switching network under control of the telephone central office. The immediate advantage, of course, is the lack of necessity to extend an individual telephone line directly from the central office to each subscriber without degrading the quality of service offered to each subscriber.

An advanced concentrator arrangement of this type is disclosed in an application of Harr-Lowry-Nehama-Ridinger, filed October 26, 1959, Serial No. 848,595, now Patent 3,116,375 of December 31, 1963. This application describes a line concentrator compatible with electronic central office switching equipment.

Perhaps one of the most significant problems encountered in utilization of line concentrator units is the divorcement of the substation line from its traditional electrical bond to the telephone office over a metallic pair. As disclosed in detail in the above-referred-to application, the substation lines are no longer directly connected to the telephone office, and in lieu thereof are terminated at a remote concentrator unit. Thus, the usual metallic connection to the office has been severed. As a result, the most routine supervisory signals which emanate from the substation line, such as substation off-hook, dial signals, etc., can no longer be "seen" at the central office and instead must be relayed thereto over appropriate control channels.

The problem of maintaining the remote substation lines in control communication with the central office is efficiently resolved in the above-referred-to application by continuously scanning all of the substation lines at their terminations in the remote concentrator unit. As each line is scanned for the supervisory condition thereon, a remote counter is stepped one position relative to the identity of the line being scanned. A similar counter located at the telephone central office is stepped in synchronism therewith and maintains the same count. Regularly occurring interrogation pulses are transmitted to the remote unit to step the counter and advance the scanner. As indicated in the above referred to application, a service request condition on a particular line will be detected when the scanner examines the line termination, and a signal indication of the service request is transmitted to the central office. The service request signal, in arriving at the central office, triggers equipment to inhibit further transmission by the interrogating pulse source and thus the remote unit counter and the central office line counter remain "frozen" at the designation of the line requesting service. This arrangement precludes the necessity of transmitting the identity of the service requesting line to the office since it already exists in the counter thereat.

Although completely operative and useful, certain inefficiencies inhere in this arrangement. This derives from the fact that, as indicated in the above referred to application, a large number of remote concentrator units connected to as many as several thousand subscribers may have their counters operated synchronously with the counter at the central office as described. Since the counter at the central office is brought to a complete standstill along with the counter at the remote service requesting unit, until the service request can be acted upon, the scanning of thousands of lines is abruptly and completely terminated until the central office equipment can respond to the service request of only a single line.

It is, therefore, an object of this invention to provide for the scanning of other nonservice requesting concentrators after a service request from a particular remote concentrator has been received.

Still another object of this invention is to provide for the service requesting and nonservice requesting concentrators to react to continued interrogation pulses from the central office in completely different modes.

A further object of this invention is to provide for the interpretation of such further interrogation signals by the service requesting line concentrator as link (common channel) identifying signals.

Another object of this invention is to provide for the interpretation of such further interrogation signals by nonservice requesting concentrators as scanning pulses.

Still another object of this invention is to provide for the shifting in mode of operation by service requesting line concentrators in response to an interruption in interrogation pulses.

These and other objects and features of the invention are achieved in an illustrative embodiment in which, in lieu of interrupting all further interrogation pulses on the advent of a service request, a pulse generator continues to function and to transmit interrogation pulses to all nonservice requesting line concentrators. Arrangements are provided to temporarily inhibit the flow of these interrogating pulses to the particular remote concentrator unit in a service requesting condition. The interruption in pulse flow is construed (as explained herein in detail) by the remote unit as an order to shift in mode of operation. Thereafter the interrogation pulses transmitted to the service requesting concentrator are interpreted by that concentrator as order signals for establishing a link or channel identity, this identification being the number of the link to which the service requesting line is to be connected to effectuate an extension of the line to the central office. Also as indicated herein, the service requesting concentrator, having shifted in mode of operation, will interpret the subsequent interrogation pulses as order pulses despite the fact that these pulses are the same pulses being supplied to nonservice requesting line concentrators at the same time as scanning or interrogation pulses.

Thus, after the service request signal has been received at the office, the service requesting line concentrators and nonservice requesting line concentrators react to identical pulses in wholly different modes; the former interpreting the pulses as link identifying signals, and the latter merely as scanning pulses.

In contrast to the "all-stop" operation described above with respect to the application of Harr-Lowry-Nehama-Ridinger, the nonservice requesting concentrators continue to periodically scan their own lines for service, avoiding the situation in which the scanning of several thousand lines is inhibited in response to a service request on only one of the lines. In lieu thereof, the service requesting line concentrator is actually disposing of the request by using as order signals (for channel selection), the same signals that are transmitted to the other concentrators as merely scanning pulses.

A feature of this invention includes circuitry in a remote concentrator unit for shifting in mode of operation to provide a link number identity in response to pulses previously interpreted as scanning pulses.

Still another feature of this invention includes facilities for continuing the scanning of nonservice requesting line concentrators after a service request has been received.

A further feature of this invention includes equipment at the telephone central office for effecting a shift in mode of operation of selected remote concentrator units.

Figures 2, 3:
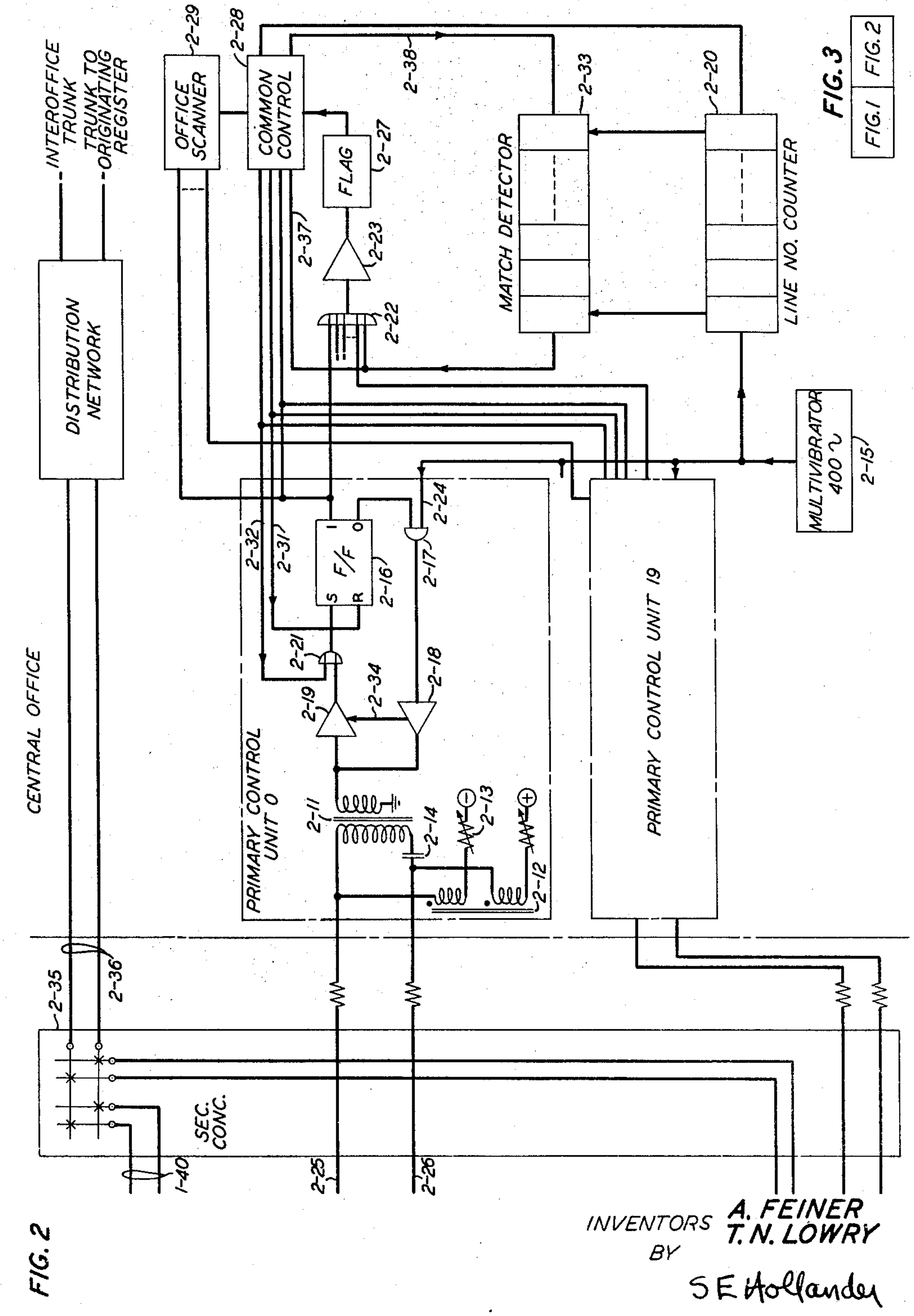

These and other objects and features of the invention may be more readily apprehended from an examination of the following specification, appended claims, and attached drawing in which:

FIG. 1 indicates the remote primary concentrator equipment utilized for scanning and control in one specific illustrative embodiment of our invention;

FIG. 2 indicates the secondary concentrator and central office portion of the circuitry coupled to that shown in FIG. 1; and FIG. 3 shows the relative disposition of FIGS. 1 and 2 to disclose the invention.

In FIGS. 1 and 2, only those portions of the equipment necessary for a comprehension of the present invention are shown. For a complete exposition of the remote and central office circuitry suitable for use in conjunction with applicants' invention, reference may be made to the above-referred-to application.

*General Description of Major Components*

In FIG. 1, substations 1 and 63 are shown as symbolic of the 63 substations connectable to remote unit 0. Similarly, remote unit 19 is shown, although illustratively, as many as 20 remote units may be connected to the single secondary concentrator 2–35 and from the latter to the distribution network at the central office. Although only a single secondary concentrator is shown, it is assumed that a number of secondary concentrators similarly constituted may be connected to the distribution network at the central office, as explained in detail in the above referred to application.

Remote unit 0, shown in FIG. 1, includes line supervisory circuits 1–43 and 1–44 which react to changes in signal condition, such as off-hook, dialing, etc., by providing a detectable condition to scanner 1–35. The latter has been shown symbolically as a stepping switch although it is understood that various other configurations including transistor tree networks may be suitable.

In basic format, remote unit 0 provides terminations for 63 lines and includes facilities in primary switching network 1–38 for connecting these lines to a smaller number of links 1–40, only one of which is shown. The links extend to the secondary concentrator which also includes a switching network (not shown) for connecting the links over a smaller number of trunks, only one of which (2–36) is shown, to the central office distribution network. Ultimately the concentrator circuitry, in order to provide a speech path from a particular subscriber to the central office, for example the subscriber connected to substation 1, must extend the loop circuit of the subscriber through the primary switching network 1–38 and a selected idle link, e.g., 1–40, to the secondary concentrator. The latter must extend the selected link over a selected idle trunk, e.g., 2–36, to the central office. The distribution network at the central office may further extend the connection in accordance with the particular type of call being serviced. Thus, the call may be extended to an originating register to receive dial signals or over an interoffice trunk to extend the connection to a distant office.

Each of the remote units 0 to 19 is coupled to a corresponding control unit at the central office over a control pair reserved for signaling and supervisory indications and shown illustratively for remote unit 0 as conductors 2–25 and 2–26.

All of the individual component circuitry in FIGS. 1 and 2, including the dial circuits, monostable circuits, amplifiers, etc., are well known and have been disclosed, for example, in the above referred to application. For clarity of presentation of the present inventive concepts, these components are shown in outline form. Similarly, the line counter 1–22 and link counter 1–25 are shown symbolically as stepping switches although other circuitry may be suitable. The line counter terminals are connected to the respective lines to provide access to the network for marking the lines to the links as explained in detail herein. In this respect the line mark selector of the above referred to application is shown symbolically as combined with the line counter thereof.

The match detector and line number counter at the central office are also shown in outline form and may illustratively be conventional multistage binary counters with comparison facilities coupling the two to provide an indication of a match condition. Alternatively, the match detector and line number counter may take the form of stepping switches similar to that shown for counter 1–22 with corresponding terminals connected to AND gates to produce an output when the switches are both at the same numbered terminals. The flag indicator 2–27, although shown as an entity distinct from the common control circuit 2–28, for clarity of description, may conveniently be a flip-flop or other memory device associated with or part of the common control. The role of the office scanner 2–29 is, as indicated in the above referred to application, to apprise the common control circuit 2–28 of various changes in condition in the concentrator control circuitry and also to examine direct-connected or nonconcentrated lines.

In addition to control signals, the control pairs 2–25 and 2–26 are used to transmit D.C. power from source 2–13 to remote battery 1–13. Split inductors 1–12 and 2–12 are wound in a manner in conjunction with capacitors 1–14 and 2–14 to isolate the power transmission circuits from the signal transmission circuit.

*Quiescent Operation*

When the concentrator is not in the process of originating or terminating calls, a sequence of operations, as described hereinafter, is in effect.

A free-running multivibrator 2–15 which may illustratively operate at a 400-cycle rate, generates a train of pulses at a 2.5 millisecond spacing. These pulses are transmitted via conductor 2–24 to one input of AND gate 2–17. The other input of AND gate 2–17 is energized by the 0 output terminal of flip-flop 2–16 which latter is normally reset. AND gate 2–17 is enabled, permitting the pulses from generator 2–15 to be amplified in amplifier 2–18. Amplified signals emanating from amplifier 2–18 are transmitted through transformer 2–11 to the control pair 2–25 and 2–26. It will be seen, in addition, that operation of amplifier 2–18 applies an inhibiting signal to amplifier 2–19 over conductor 2–34 to prevent amplification of the output signals of amplifier 2–18.

Thus, a continuous train of interrogation pulses is applied to the control pair 2–25 and 2–26 and is received at the remote unit through transformer 1–11 by signaling amplifier 1–15. A modulo 2 counter 1–16 (which may illustratively be a two-stage recycling binary counter) is arranged to enable gate 1–17 at this time (by the energization of the "0" output stage), in order that pulses received through amplifier 1–15 may trigger the monostable circuit 1–18. The latter produces an illustrative 300-microsecond output pulse when triggered. This pulse at the output of monostable circuit 1–18 enables AND gate 1–19 and also advances line number counter 1–22 and scanner 1–35 through delay circuit 1–21.

Since the line scanner 1–35 is addressed one number ahead of the line number counter 1–22, as explained in the above referred to application, any service request related to the number stored in the line number counter would be evidenced at the scanner output connected to gate 1–19 at this time. As a practical matter this obviates the necessity of including the reaction time of the scanner circuitry and detector 1–39 as a factor in determining interrogation pulse frequency. If a service request was in effect at substation 1 as a result of a substation going off-hook, scanner 1–35 would receive an indication from line supervisory circuit 1–43; AND gate 1–19 would be energized and in turn would trigger signal amplifier 1–20 with the result that a pulse would be transferred through transformer 1–11 to the control pair 2–25 and 2–26. At the same time, signal amplifier 1–15 would be inhibited over conductor 1–36 to prevent local response to the signal.

A monostable circuit 1–23 is set upon the arrival of each interrogating pulse from the generator 2–15 and commences a 5-millisecond timing interval. However, the monostable circuit is ordinarily reset in 2.5 milliseconds in view of the arrival of the next succeeding control pulse.

Thus, in summary, during quiescent operation of the circuit and in the absence of service requests, a continuous train of interrogation pulses is transmitted from the generator 2–15 to the remote unit and results in stepping of the line number counter 1–22 at the remote unit, and synchronous stepping of the line number counter 2–20 at the central office. Also, in response to each interrogation pulse, the scanner circuitry 1–35 is advanced one step.

*Service Request at Remote Unit*

Upon the initiation of a service request by a substation going off-hook, for example substation 1, the change in electrical condition of the line circuit 1–43 is detected by scanner 1–35 through detector 1–39 when it arrives at the terminal 1 to which the service requesting line is connected. The arrival of the next interrogation pulse which steps counter 1–22 to the desired line number immediately produces an output from AND gate 1–19 since the scanner 1–35 is one step cycle ahead of the counter 1–22 and the detector 1–39 has already stored the indication as explained in detail in the above referred to application. Energization of AND gate 1–19 delivers an output signal through amplifier 1–20 and the control pair 2–25 and 2–26, as indicated above, and is received through transformer 2–11 by signal amplifier 2–19. The latter sets flip-flop 2–16 through OR gate 2–21. Energization of flip-flop 2–16 to the "set" condition in this case corresponds to the initiation of the service request at the remote unit. Energization of flip-flop 2–16 provides an output through OR gate 2–22 which energizes "flag" indicator 2–27 through amplifier 2–23. The latter is a signal indication to common control 2–28. In response to the flag indication, common control 2–28 observes the number registered in the line number counter and initiates scanning in office scanner 2–29 to determine in which control unit the flip-flop 2–16 initiated the flag as explained in detail in the above referred to application.

The service requesting concentrator is now deprived of subsequent interrogation pulses in view of the inhibiting of AND gate 2–17 by flip-flop 2–16. All other concentrators (including remote unit 19), however, continue to advance at the same 2.5-millisecond intervals in response to the pulses generated by multivibrator 2–15.

Common control 2–28, before any further pulses are generated, enters a number in the match detector 2–33 over conductor 2–38 which is two numbers greater than the previous line number in counter 2–20. As a result, when two further interrogation pulses have been generated, the match detector 2–33 produces a match indication or output on conductor 2–37 which is transmitted through OR gate 2–22 and amplifier 2–23 to the flag indicator 2–27 (which latter may be a conventional bistable or flip-flop memory device). The brief delay of two cycles is to permit operation of the 5-millisecond monostable circuit 1–23 at the remote location. As indicated above, monostable circuit 1–23 will complete its 5-millisecond timing interval if interrogation pulses are discontinued. Thus, monostable circuit 1–23 "times out" and produces an output which causes modulo 2 counter 1–16 to change state (i.e., energize the "1" output stage). Operation of counter 1–16 disables AND gate 1–17 and enables AND gate 1–24. Link number counter 1–25 is set to the number 19 over capacitor 1–45 as shown symbolically by the appropriate operation of switch 1–41. When the remote unit is in this condition, further interrogation pulses received in signaling amplifier 1–15 are construed as orders to advance the link counter 1–25 rather than the line counter 1–22.

When common control is notified of the match indication through flag indicator 2–27, it accepts the number shown by the line number counter 2–20 and this time adds a number thereto corresponding to the desired link number chosen for the originating connection in the remote unit plus four. Specifically, if the line number requesting service was line 1, the number which would have been originally entered in the match detector 2–24 would have been 1+2 or 3, in order to allow a sufficient interval of inhibition of AND gate 2–17 to permit operation of 5-millisecond timing circuit 1–23. When the match at number 3 in the line number counter was indicated, the new number entered in the match detector is 3, plus the number of the idle link selected for connection to the line which may illustratively be link number 5; this yields 8. To this is added 4 (for reasons indicated herein) and the number 12 is entered in the match detector.

Common control 2–28 thereafter resets flip-flop 2–16 through the reset shift conductor 2–31 which re-enables gate 2–17. Subsequent pulses from the multivibrator 2–15 (which itself has continued uninterruptedly throughout the above) are transmitted to the remote concentrator over the path traced above. Signal amplifier 1–15 transfers these interrogation pulses through AND gate 1–24 to the link number counter 1–25 since AND gate 1–17 is inhibited.

When the line number counter 2–20 is advanced to the number (12) previously placed in the match detector 2–24, a second match indication is delivered over conductor 2–37 through OR gate 2–22 and amplifier 2–23 to energize flag indicator 2–27 to the common control circuit. Common control, in response to this flag indication and to the energization of conductor 2–37 indicating that the flag has been energized as the result of a match condition, operates flip-flop 2–16 through the set shift input 2–32 and OR gate 2–21. Thereafter, common control 2–28 enters in the match detector 2–24 the line number (1) of the service requesting line. Setting of flip-flop 2–16 again inhibits AND gate 2–17 to introduce another interruption in the flow of interrogation pulses, permitting 5-millisecond monostable circuit 1–23 to again time out. When the timing is completed, monostable circuit 1–23 produces an output which changes the position of modulo 2 counter 1–16 to re-energize the "0" output stage. This change in the counter 1–16 delivers an input signal through capacitor 1–37 to monostable circuit 1–26 and also enables AND gate 1–17 while disabling AND gate 1–24. This restores the original signal receiving condition of the remote concentrator unit.

Monostable circuit 1–26 delivers an input signal to AND gate 1–30 and in view of the lack of input to inverter 1–27, since the link number counter is illustratively indicating link 5 (terminal 8 of the counter), the inverter 1–27 also produces an input to AND gate 1–30. This results in the transmission of a marking instruction to the network 1–38 to effectuate the closure of contacts associated with the line number in counter 1–22 and the link number shown in counter 1–25 as explained in detail in the above-referred-to application. When the monostable circuit 1–26 times out after 100 microseconds, the inverter 1–29 produces an input signal to monostable 1–28 which in turn produces an output resulting in the clearing of link number counter 1–25 in a manner shown symbolically by the appropriate operation of switch 1–42.

At this time the service requesting concentrator unit has been ordered to close the connection between the originating line (1) and a particular link designated by the central office (5). Having executed this instruction, the service requesting concentrator remains passive while all other concentrators continue scanning as before.

In the embodiment of FIG. 1, four numbers have been included in the link number counter, namely, 0–3 which do not correspond to physical links in the network. These codes are reserved for supervision and synchronizing purposes. For example, code number 1 may be used as an instruction to reclose the cut-off contact normally employed to isolate the customer's line from the line supervisory circuit. This accounts for the "plus four" added to the selected link number since the first four numbers cannot be used as physical link numbers.

When the originating line number next appears in the line number counter 2–20, the match detector 2–23 again produces a match indication to energize flag indicator 2–27 and conductor 2–37 to common control. The latter then proceeds to operate flip-flop 2–16 via the reset shift conductor 2–31 to again enable AND gate 2–17 by resetting flip-flop 2–16. Thus, the next interrogation pulse from multivibrator 2–15 is delivered through AND gate 2–17 over the path previously traced to the service requesting concentrator and all concentrators are again in synchronism and proceeding to scan the associated lines in the manner prior to the reception of the service request.

*Terminating Call*

Processing of terminating calls is in a manner similar to that for the service request calls discussed above with the exception that the flip-flop 2–16 is governed in all instances by common control 2–28 in lieu of a remotely generated service request signal. In this instance, use of the match detector 2–33 in combination with counter 2–20 to notify the common control of the occurrence of the line number representing the terminating call in the system, is performed in the manner described in the above-referred-to application. The transmission of network instructions to the remote concentrators by interruption of the pulse trains to permit the 5-millisecond monostable circuit 1–23 to operate is carried out in the manner described above for a service requesting call.

*Synchronism Check*

The checking of synchronism between the remote counter 1–22 and the office counter 2–20 is achieved by monostable circuit 1–31 which produces an output indicating a service request at scanner position 0. Routine tests are made at intervals by the transmission of link number code 3 when the office counter 2–20 indicates position 0. The output of the link number counter for terminal 3 is combined in AND gate 1–32 with the 0 output of the line counter 1–22 and through OR gate 1–33 triggers monostable circuit 1–31. Thus, if the line number counter 1–22 is at position 0 when the test is performed, a service request representing line 0 is transmitted to the office on the following scan cycle. If the remote counter 1–22 is out of synchronism with counter 2–20 in the central office, the absence of a service request at the specified time indicates to the common control that this particular concentrator has fallen out of synchronism and must be restored thereto.

*Restoration of Synchronism*

In order to reproduce the desired synchronization between the office and remote counter, common control 2–28 transmits the link number 2 in order to provide for the triggering of monostable circuit 1–31 through OR gate 1–33 and a simulated service request when counter 1–22 reaches 0. Common control as described above delivers a signal to flip-flop 2–16 over conductor 2–32 to set the flip-flop, causing an interruption in the flow of interrogating pulses to the remote unit, timing out of 5-milliseconds monostable circuit 1–23, and the interruption of further advance of the line counter 1–22. This condition is permitted to obtain until all the other remote concentrators return to the 0 count in the line number counters.

Since the "service request" condition generated through OR gate 1–33 will occur when scanner 1–35 reaches terminal 0, independent of the existing count in scanners in other remote units, it will be assumed for explanatory purposes that the remaining remote units are at line 9 (not shown) when the "service request" signal is received from remote unit 0. As indicated above, flip-flop 2–16 is set at the central office and further pulses to the remote unit are interrupted. At this time, the common control circuitry in the central office enters a number in the match detector 2–33 over control conductor 2–38 which is equal to the number at which the other scanners are operating plus two (illustratively nine plus two or eleven). As described above, multivibrator 2–15 continues to step the line number counter 2–20 and when a match indication is detected, a signal is delivered over conductor 2–37 to the common control and through OR gate 2–22, amplifier 2–23 and flag 2–27. In response to the match indication, common control 2–28 in accordance with the procedure described above resets flip-flop 2–16 over conductor 2–31 and at the same time stores a number in the match detector equal to the illustrative number plus four (i.e. nine+four) or thirteen.

As a result of the resetting of flip-flop 2–16, AND gate 2–17 is enabled and pulses are delivered to the remote unit where, in view of the setting of counter 1–16 to the count of 1, they are delivered to the link counter.

The link counter 1–25 is permitted to operate until the next match indication is made at number 13. Thus, the link counter is permitted to step two positions from terminal 19 to terminal 1. Again, the match detector delivers a signal to the common control circuit indicative of the match condition and common control 2–28 delivers a signal over control conductor 2–32 to set flip-flop 2–16 thereby interrupting pulses to the remote unit in the manner explained hereinabove. As a result of the interruption of pulses, the remote unit 0 reacts to shift in mode of operation and in consequence of the "timing out" of monostable circuit 1–23 and the return of counter 1–16 to the "0" count, thereby disabling AND gate 1–24 and enabling AND gate 1–17.

At this time, common control 2–28 places the number 0 in the match detector. Since the line counter in remote unit 0 was previously stopped at line 0, at the next match indication the office counter 2–20 will also be at the count of 0. In view of the match indication delivered to common control 2–28 at that time, flip-flop 2–16 will be reset over conductor 2–31 to permit the flow of continued interrogation pulses to remote unit 0 which now directs the pulses to scanner 1–35 and counter 1–22 thereby restoring synchronism between remote unit 0 and the central office.

It will be noted that link counter 1–25 is provided with a "blank" terminal at terminal 1 in order to provide for the above synchronizing procedure.

It is understood that the above embodiment is merely exemplary and that various modifications may be made by those skilled in the art without departing from the spirit and scope of the invention.

What is claimed is:

1. A telephone line concentrator system including a telephone central office, a plurality of trunks extending from said office, a larger plurality of substation lines, a plurality of remote concentrator units for connecting said lines to said trunks under control of said central office, means at said office for transmitting interrogation signals simultaneously to said remote concentrator units, first and second means in said remote units, means in said concentrator units normally responsive to the reception of said signals for energizing said first means, and means responsive to a shift of mode signal from said central office for responding to said signals subsequent to said change of mode signal to energize said second means.

2. A control signaling circuit for use in a telephone line concentrator system having a central office and a remote switching unit including means at said central office for transmitting sequential interrogation signals to said remote switching unit to ascertain the state condition of the lines connected thereto, additional means in said office for temporarily inhibiting the flow of said interrogation signals to said remote switching unit, and means at said remote unit responsive to said inhibition for effecting a change in mode of operation of said remote switching unit in response to additional signals received subsequent to said temporary inhibition.

3. A telephone line concentrator system including a telephone central office, a plurality of trunks extending from said office, a plurality of remote substation lines greater in number than said trunks, a plurality of remote switching units for connecting said lines to said trunks under control of said office, means in said office for transmitting interrogation pulses to each of said switching units simultaneously to ascertain the state condition of the lines connected to said units, additional means at said office responsive to a service request signal on one of said lines for delivering a change signal to said particular remote unit associated with said service-requesting line, and means at said central office for thereafter transmitting additional pulses to said particular remote unit for executing order instructions and for transmitting the same pulses to said other units to ascertain the state condition of the lines connected thereto.

4. A telephone line concentrator system including a central office, a plurality of trunks extending from said office, a plurality of substation lines greater in number than said trunks, a plurality of remote concentrator units including connecting means for connecting said lines to said trunks under control of said central office, scanning means at said remote units responsive to the reception of interrogation pulses from said office for sequentially detecting service conditions on said lines, means at said central office responsive to a service request indication on one of said lines for inhibiting said interrogation pulses to said particular remote unit to which said line is connected, and means at said central office for thereafter transmitting additional pulses to said particular remote unit to activate said connecting means and for transmitting said additional pulses to said other remote units to energize said scanning means.

5. A telephone line concentrator system including a central office, a plurality of substation lines, a plurality of links connectable to said office, a plurality of remote switching units for connecting said lines to said links under control of said office, first and second means in said remote switching units, means at said central office for transmitting a train of signals to said remote switching units to synchronously activate all of said first means, means in said office responsive to the energization of one of said lines for transmitting a shift-mode signal to said unit connected to said line without interrupting said train of signals to said other units, and means in said office for subsequently transmitting said signals to said remote unit to activate said second means.

6. A line concentrator system including a central office, a plurality of links connectable to said office, a larger plurality of remote lines, a plurality of remote switching units for connecting said lines to said links under control of said office, counter means at said office and at each of said remote units, means at said office for transmitting signals to said remote units to sequentially and synchonously advance all of said counters, additional means at said office responsive to a service request condition at one of said lines for inhibiting the flow of said signals to said particular counter at said remote unit associated with said one line while containing said signals to said other counters, and additional means at said central office for thereafter effecting the synchronization of said particular counter with said other counters.

7. A telephone line concentrator system including a telephone central office, a plurality of links connectable to said office, a larger plurality of substation lines, a plurality of remote concentrator units for connecting said lines to said links under control of said office, scanning means at said remote units for sequentially examining the state condition of said lines and for transmitting informaindicative thereof to said office, line counting means at said office and at each of said remote units, means at said office for transmitting a train of pulses in parallel to said remote units to synchronously actuate said scanning means and line counting means, additional means at said office responsive to the reception of information indicating a service request condition on one of said lines for temporarily inhibiting the transmission of said pulses to said particular unit associated with said line, link counting means in said remote switching unit, and means in said remote switching unit responsive to subsequent pulses transmitted by said office for actuating said link counting means in synchronism with the actuation of said line counting means in said other units.

8. In a telephone line concentrator system, a central office, a plurality of links connectable to said office, a plurality of lines greater in number than said links, a plurality of remote switching units for connecting said lines to said links under control of said office, scanning means in said remote units, means in said office for transmitting a series of interrogation pulses to actuate said scanning means, link counting means in said remote units, means in said office for interrupting said series of pulses temporarily to a selected one of said units without interrupting said pulses to said other units, means at said selected unit responsive to pulses subsequent to said interruption to actuate said link counting means, and means in said other units responsive to the same pulses occurring after said interruption to actuate said scanning means.

9. A telephone line concentrator system including a central office, a plurality of links connectable to said office, a plurality of substation lines greater in number than said links, remote switching units for connecting said lines to said links under control of said office, scanning means at each of said remote switching units for sequentially examining the condition of said lines in response to interrogation pulses from said central office and transmitting indications representative thereof to said central office, link counting means in said remote switching units, means at said central office responsive to a service request condition at one of said lines for inhibiting said pulses to said scanning means at said particular switching unit associated with said one line while advancing all of said other scanning means, means for subsequently transmitting additional pulses to said particular remote switching unit indicative of a selected idle link, means at said particular remote switching unit responsive to said inhibition of said pulses to said scanning means for actuating said link counting means in response to said additional pulses, means in said central office responsive to the connection of said line to said selected link for inhibiting the transmission of said additional pulses to said remote switching unit, and means at said remote switching unit responsive to said second inhibition of pulse transmission and the reception of further pulses for thereafter energizing said scanning means in response to said further pulses.

10. A telephone line concentrator circuit including a telephone central office, a plurality of links connectable to said office, a plurality of remote substations greater in number than said links, a plurality of remote switching units for connecting said lines to said links under control of said central office, generator means at said central office for transmitting a train of pulses to said remote units, scanning means at each of said units connectable to said lines and responsive to said pulses for detecting signal conditions on said lines, link counting means at each of said remote units for energizing a selected idle link preparatory to connection to a line, mode-shifting means at said remote units, means at said office responsive to a service request condition at one of said lines for inhibiting transmission of said pulses to said particular remote unit to which said line is connected and for uninterruptedly continuing the transmission of said pulses to energize said scanning means at said other units, means at said particular remote unit responsive to the interruption of said pulses for energizing said mode-shifting means, and means at said remote unit jointly responsive to the energization of said mode-shifting means and the reception of additional pulses from said central office for diverting said pulses from said scanning means to energize said link counting means.

11. A remote telephone concentrator circuit including a telephone central office, a plurality of links connectable to said office, a plurality of remote substation lines, a plurality of remote concentrator units for connecting said lines to said links under control of said central office, scanning means in said remote units for sequentially examining the service condition of said lines, means in said central office for synchronously operating each of said scanning means, and means at said central office responsive to a service request condition at a particular remote unit for arresting said scanning means at said particular unit while continuing the sequential energization of said scanning means at said other units.

12. A remote telephone concentrator circuit including a central office, a plurality of links connectable to said office, a plurality of substation lines greater in number than said links, remote switching units for connecting said lines to said links under control of said central office, counting means at said central office, line counters at each of said remote units, link counters at said remote switching units, means at said office for transmitting signals to said remote units to sequentially and synchronously advance all of said line counters, additional means at said office responsive to a service request condition at one of said lines for inhibiting the transmission of said signals to said line counter at said particular remote unit associated with said one line while continuing said signals to said other line counters, means at said office for advancing said office counting means to a predetermined number, and means responsive to the advance of said office counting means to said predetermined number for thereafter transmitting said signals to said particular remote unit to advance said link counters.

13. A telephone line concentrator system including a telephone central office, a plurality of links connectable to said office, a plurality of substation lines greater in number than said links, a plurality of remote switching units for connecting said lines to said links under control of said office, counting means at said office, line counters at each of said remote units, link counting means in said remote units, means at said office for transmitting a train of pulses in parallel to said remote units to synchronously actuate said line counters, means at said office responsive to the reception of information indicating a service request condition on one of said lines for temporarily inhibiting the transmission of said pulses to said line counter in said particular unit associated with said one line, means in said particular remote switching unit responsive to subsequent pulses transmitted by said office for actuating said link counting means in synchronism with the actuation of said line counters in said other units, additional means in said office for advancing said office counting means to a predetermined number equal to the existing number in said office counting means plus a sum representative of a selected link number and a fixed number, and means responsive to the advance of said office counter to said predetermined number for temporarily inhibiting the transmission of said pulses to said link counting means.

14. A telephone line concentrator system in accordance with claim 13 including in addition means at said particular remote switching unit responsive to still further pulses transmitted from said office for again actuating said line counter.

References Cited in the file of this patent

UNITED STATES PATENTS 2,957,949 James et al. ------------ Oct. 25, 1960